(12) United States Patent
Siomina et al.

(10) Patent No.: US 10,708,963 B2
(45) Date of Patent: Jul. 7, 2020

(54) TRANSMITTER AND/OR RECEIVER DETERMINATION FOR D2D OPERATION

(71) Applicant: Telefonaktiebolaget LM Ericsson (publ), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/516,306

(22) PCT Filed: Oct. 2, 2015

(86) PCT No.: PCT/SE2015/051040
§ 371 (c)(1),
(2) Date: Mar. 31, 2017

(87) PCT Pub. No.: WO2016/053178
PCT Pub. Date: Apr. 7, 2016

(65) Prior Publication Data
US 2017/0251509 A1    Aug. 31, 2017

Related U.S. Application Data

(60) Provisional application No. 62/059,307, filed on Oct. 3, 2014.

(51) Int. Cl.
H04W 4/00     (2018.01)
H04W 76/14    (2018.01)
H04W 8/00     (2009.01)

(52) U.S. Cl.
CPC .......... H04W 76/14 (2018.02); H04W 8/005 (2013.01)

(58) Field of Classification Search
CPC ....... H04W 76/14; H04W 8/005; H04W 4/02; H04W 4/06; H04W 76/002;
(Continued)

(56) References Cited

U.S. PATENT DOCUMENTS 6,006,106 A      12/1999  Cook et al.
9,930,631 B2 *    3/2018  Yang .................. H04W 56/002
(Continued)

FOREIGN PATENT DOCUMENTS

GB    2497579 A       6/2013
WO    2013068788 A1   5/2013
WO    2014133832 A1   9/2014

OTHER PUBLICATIONS

Unknown, Author, "ProSe Multi-Carver Support", Ericsson, 3GPP TSG-RAN WG2 #87, Tdoc R2-143572, Dresden, Germany, Aug. 18-22, 2014, 1-5.

*Primary Examiner* — Minh Trang T Nguyen
(74) *Attorney, Agent, or Firm* — Murphy, Bilak & Homiller, PLLC

(57) ABSTRACT

A D2D device for a wireless communication network is described. The D2D device comprises a set of transmitters and/or a set of receivers. Furthermore, the D2D device is adapted for determining one or more transmitters from the set of 5 transmitters and/or one or more receivers from the set of receivers, which are to be used for at least one D2D operation. There are also described related methods and devices.

12 Claims, 6 Drawing Sheets

(58) Field of Classification Search
CPC ........... H04W 76/023; H04W 76/40; H04L
12/1854; H04L 12/189; H04L 1/08; H04L
1/1607
See application file for complete search history.

(56) References Cited

U.S. PATENT DOCUMENTS

| | | | |
|---|---|---|---|
| 2012/0113794 A1* | 5/2012 | Roman | H04B 7/0452 370/201 |
| 2013/0058216 A1 | 3/2013 | Krishnaswamy et al. | |
| 2013/0088398 A1 | 4/2013 | Utagawa et al. | |
| 2014/0219261 A1* | 8/2014 | Johnsson | H04W 8/005 370/338 |
| 2014/0274088 A1* | 9/2014 | Talwar | H04J 11/0023 455/452.1 |

* cited by examiner

TRANSMITTER AND/OR RECEIVER DETERMINATION FOR D2D OPERATION

TECHNICAL FIELD

This disclosure pertains to methods and devices for D2D operation in wireless communication arrangements and networks.

BACKGROUND

For modern wireless communication networks, like LTE, there may be supported communication modes directly between user equipments, with a base station or eNodeB not being involved or only providing supporting functionality, e.g. resource management and/or scheduling. D2D or ProSe technology provides such functionality.

SUMMARY

It is an object of the present invention to provide approaches for utilizing RF or circuitry resources, in particular transmitters and/or receivers, related to D2D communication.

There is disclosed a method for operating a D2D device for a wireless communication network, the D2D device comprising a set of transmitters and/or a set of receivers. The method comprises determining one or more transmitters from a set of transmitters and/or one or more receivers from a set of receivers, which are to be used for at least one D2D operation.

Moreover, a D2D device for a wireless communication network is described. The D2D device comprises a set of transmitters and/or a set of receivers. Furthermore, the D2D device is adapted for determining one or more transmitters from the set of transmitters and/or one or more receivers from the set of receivers, which are to be used for at least one D2D operation.

A method for operating a second D2D device, UE2, for a wireless communication network is also considered. The method comprises assisting a first D2D device, UE1, in determining one or more transmitters from a set of transmitters and/or one or more receivers from a set of receivers, which are to be used by the first D2D device, UE1, for at least one D2D operation.

In addition, a second D2D device, UE2, for a wireless communication network is disclosed. The second D2D device, UE2, is adapted for assisting a first D2D device, UE1, in determining one or more transmitters from a set of transmitters and/or one or more receivers from a set of receivers, which are to be used by the first D2D device, UE1, for at least one D2D operation.

There may also be considered a method for operating a network node n a wireless communication network, the method comprising assisting a first D2D device, UE1, in determining one or more transmitters from a set of transmitters and/or one or more receivers from a set of receivers, which are to be used by the first D2D device, UE1, for at least one D2D operation.

A network node for a wireless communication network is also disclosed, the network node being adapted for assisting a first D2D device, UE1, in determining one or more transmitters from a set of transmitters and/or one or more receivers from a set of receivers, which are to be used by the first D2D device, UE1, for at least one D2D operation.

Furthermore, there is disclosed a program product comprising code executable by control circuitry, the code causing the control circuitry to perform and/or control any of the methods described herein.

Additionally, a carrier medium may be considered, the carrier medium carrying a program product as described herein and/or code executable by control circuitry, the code causing the control circuitry to perform and/or control any of the methods described herein.

The approaches presented allow determination of RF hardware resources like transmitters and/or receivers to be used for D2D operation, wherein a D2D device on its own or assisted by another D2D device or a network node may achieve a desired determination.

BRIEF DESCRIPTION OF THE DRAWINGS

The drawings are provided for illustrative purposes, and are not intended to limit the approaches described to the embodiments shown.

DETAILED DESCRIPTION

Generally, a UE may be considered as an example or representative of a D2D device, and the term D2D device may be interchanged for UE unless explicitly stated otherwise.

An eNodeB or eNB or base station may be considered to be one variant of a network node, in particular a controlling node.

Figure 1:
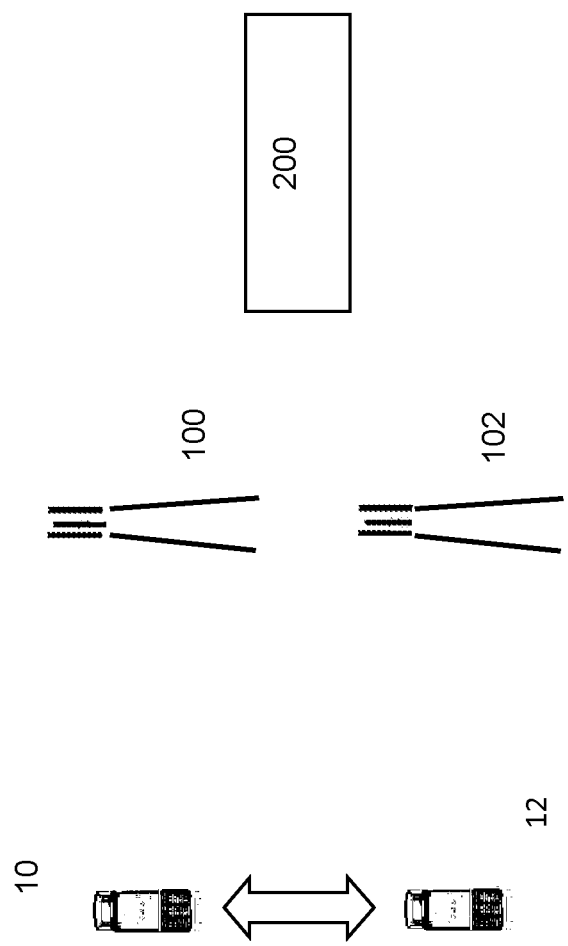
FIG. 1 schematically shows a setup for direct D2D communication in a wireless communication network.
Figure 2:
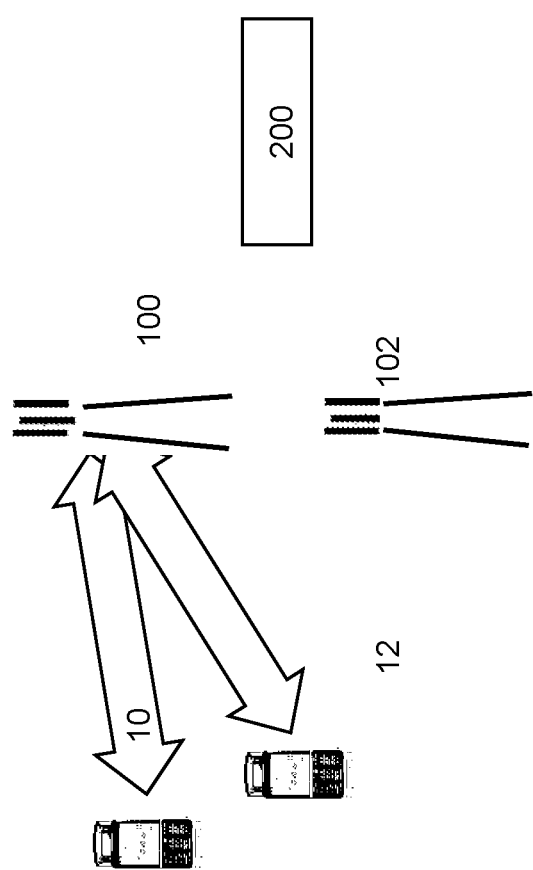
FIG. 2 schematically shows a setup for D2D communication facilitated by an eNodeB.
Figure 3:
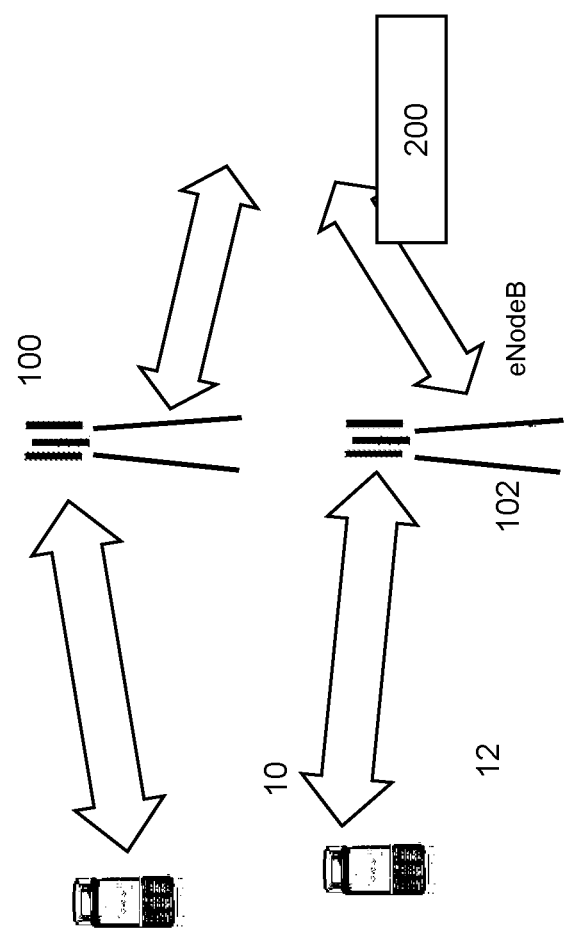
FIG. 3 schematically shows a setup for cellular communication.

In FIGS. 1 to 3, there are shown different setups for communication of user equipments (as examples for D2D devices) within a mobile communication network. In these figures, the first node or first user equipment UE1 is indicated with reference numeral 10, the second node or second user equipment is indicated with reference numeral 12.

A first base station or network node, which may be an eNodeB and/or EPC according to LTE/E-UTRAN, carries the reference numeral 100, whereas a second base station, which may be an eNodeB and/or EPC according to LTE/UTRAN, is referenced with numeral 102. The nodes 100, 102 may be configured as coordinating or controlling nodes for D2D communication between the UEs 10, 12. Reference numeral 200 indicates higher layer functions or devices of the network, to which the base stations 100, 102 may be connected or connectable, e.g. LTE packet core elements like SGW (Server GateWay) and/or PGW (PDN GateWay) and/or MME (Mobility Management Entity).

If UEs 10, 12 are in proximity to each other, they may be able to use a "direct mode" (e.g., as in FIG. 1) or "locally-routed" (e.g., as in FIG. 2) path for data communication, unlike in the conventional cellular communication (FIG. 3).

Figure 4:
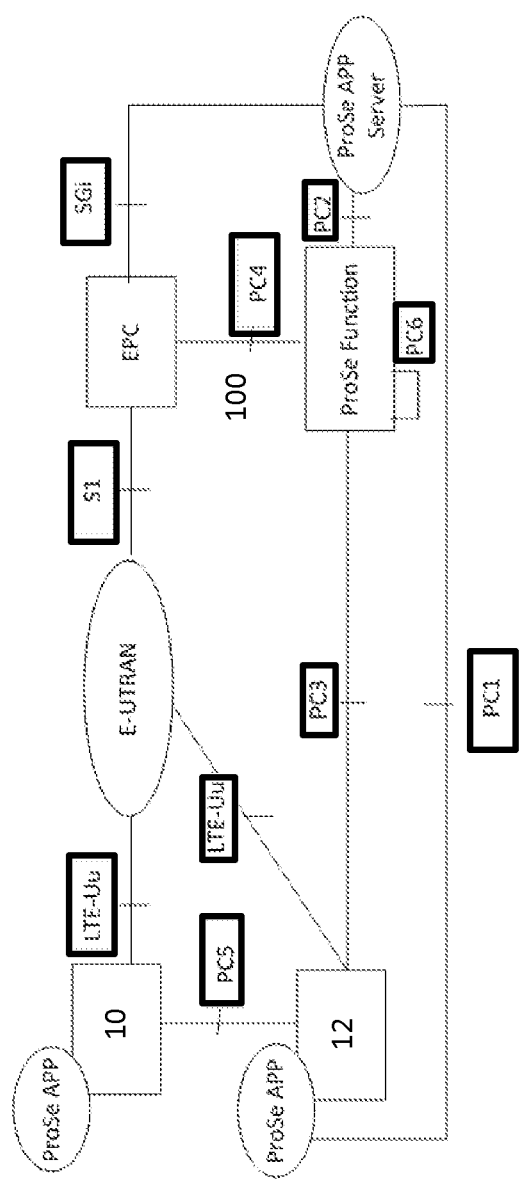
FIG. 4 schematically shows an arrangement for devices and/or services facilitating D2D or ProSe communication.

A more detailed example reference architecture for D2D operation according to one possible LTE/E-UTRAN implementation is illustrated in FIG. 4, in which only a setup with two UEs 10, 12 connected to a common base station or eNodeB 100 is shown. In FIG. 4, PCn identifies different reference points or interfaces. PC1 refers to a reference point between a ProSe application ProSe APP running on a D2D device or UE 10 or 12, PC2 a reference point between an ProSe Application server and a ProSe function provider on a server or base station side. PC3 indicates a reference point between the D2D device or UE 12 and the ProSE function, e.g. for discovery and/or communication. PC4 refers to a reference point between the EPC and the ProSe function, e.g. for setting up setting up one-to-one communication between UEs 10 and 12. PC5 is a reference point between D2D device or UE 10 and D2D device or UE 12, e.g. a first node and a second node involved in D2D communication, which may be used e.g. for direct or relayed communication between the UEs. PC6 identifies a reference point between ProSE functions of different networks, e.g. if UEs 10, 12 are subscribed to different PLMNs (Public Land Mobile Networks). SGi indicates an interface which may be used, inter alia, for application data and/or application level control. The EPC (Evolved Packet Core) may generally include a plurality of core packet functions or entities, e.g. MME, SGW, PWG, PCRF (Policy Charging and Rules Function), HSS (Home Subscriber Server), etc. E-UTRAN is the preferred RAT of the arrangement of FIG. 4. LTE-Uu indicates data transmission connections between the UEs 10, 12 and the base station 100.

Figure 5:
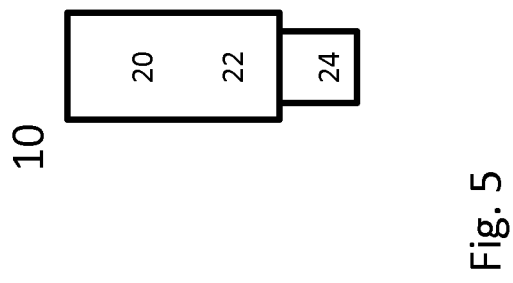
FIG. 5 shows an example of a D2D device.

FIG. 5 schematically shows a D2D device or user equipment 10, which may be a node of or for a device-to-device communication, in closer details. User equipment 10 comprises control circuitry 20, which may comprise a controller connected to a memory. A receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured or configurable for device-to-device communication, in particular utilizing E-UTRAN/LTE resources as described herein and/or receiving allocation data and/or transmit D2D data based on allocation data.

Figure 6:
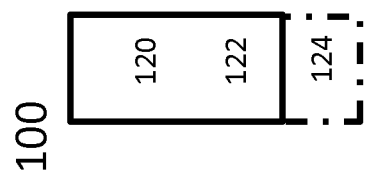
FIG. 6 shows an example of a base station.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

In multicarrier or carrier aggregation (CA) operation the UE is able to receive from and/or transmit data to more than one serving cells. In other words, a CA capable device or UE can be configured to operate with more than one serving cells. The carrier of each serving cell is generally called component carrier (CC). In simple words, component carrier (CC) refers to an individual carrier in a multi-carrier system. The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions from and to UE, respectively.

One of the CCs is the primary component carrier (PCC) or simply primary carrier or even anchor carrier. The remaining ones are called secondary component carrier (SCC) or simply secondary carriers or even supplementary carriers. The serving cell on PCC is interchangeably called as primary cell (PCell) or primary serving cell (PSC). Similarly the secondary serving cell is interchangeably called as secondary cell (SCell) or secondary serving cell (SSC).

Generally, the primary or anchor CC may carry the essential UE specific signaling, e.g. regarding resource allocation and/or scheduling and/or allocation data and/control data for the D2D device or UE. The primary CC (aka PCC or PCell) exists in and/or comprises both uplink and downlink directions in CA. In case there is single UL CC the PCell is obviously on that CC. The network may assign different primary carriers to different UEs operating in the same sector or cell.

Note also that a D2D device or UE may also be capable of performing radio measurements (typically based on received non-data radio signals) in more than one carrier frequencies, not necessarily serving ones, without being configured with CA.

At least the following problems may be envisioned without implementing the embodiments described herein:

A specific example: If a UE is CA-capable, then when configured with or for D2D operation, the UE has to borrow or utilize both baseband and RF chain of an unused CC, e.g. if the UE is K times (due to a corresponding number of receivers) DL CA capable but is configured with (K-N) times DL CA then it will reuse any of remaining Rx for baseband. However, the possibility for reusing a specific receiver depends on the UE RF architecture. In the existing solution, there is no defined rule or means based on which the UE reuses a suitable unused receiver for D2D operation. The UE behavior is unspecified.

There are various types of CA and also CA configurations (e.g. number of UL and/or DL CCs) supported by a UE. This means there are different kinds of UE radio frequency (RF) architectures, which are generally unknown or their details are unknown to the network node managing the UE. Without a defined rule and/or methodology the UE may be configured with or select any of the receivers for D2D operation causing performing degradation.

There may be cases in which the UE cannot receive in cellular DL while using the only rx for D2D.

A suggested concept is that a D2D-capable UE is selectively configured, based on its RF capability, with a receiver and/or transmitter to be used for its D2D operation.

Generally, a transceiver may provide the functionality of a transmitter (tx) and/or receiver (rx) and may a reference to a transmitter or receiver may include a transceiver, which may be seen as an implementation or representation of such.

A set of transmitters generally may comprise one or more than one transmitters, in particularly two or more than two, transmitters, e.g. two or a multiple of two transmitters. A set of receivers may comprise one or more than one receivers, in particularly two or more than two, receivers, e.g. two or a multiple of two receivers. A set of transceivers may comprise one or more than one transceivers, in particularly two or more than two, transceivers, e.g. two or a multiple of two transceivers. A transceiver may represent a transmitter and/or a receiver.

A D2D device may generally comprise a set of transmitter and/or a set of receivers. Methods in a first UE or D2D device are described as follows. There may be envisioned a method for operating a D2D device or UE comprising, and/or envisioned a D2D device or UE adapted to perform, any one or any combination of:

Step 0 (UE1) (optional): Obtaining data indicative of and/representing at least one of:
 a set of transmitters, and
 a set of receivers,
from which, and/or the data indicating or representing which, one or more transmitters and/or receivers, respectively, of the respective set, may be selected and/or selectable and/or suitable and/or configurable for at least one D2D operation. Alternatively or additionally, the data may indicate or represent which of the transmitters of the set and/or which of the receivers of the set are configured and/or selected and/or used for D2D operation. The D2D device or UE may comprise an obtaining module for this obtaining.

It may be considered that the set of transmitters and/or receivers and/or a corresponding set of transceivers is a set of and/or on the D2D device.

Step 1 (UE1) (optional): Sending to another node and/or device the obtained data and/or data indicative of and/or representing at least one of:
 a set of transmitters, and
 a set of receivers,
from which, and/or the data indicating and/or representing which, one or more transmitters and/or receivers, respectively, of the respective set may be selected and/or selectable and/or suitable and/or configurable for at least one D2D operation. Alternatively or additionally, the data may indicate or represent which of the transmitters of the set and/or which of the receivers of the set are configured and/or selected and/or used for D2D operation. The D2D device or UE may comprise a sending module for this sending. It may be considered that the set of transmitters and/or receivers and/or a corresponding set of transceivers is a set of and/or on the D2D device. Generally, the D2D device may inform and/or be adapted to inform one or more other devices about its capabilities and/or its current setup for D2D operation.

Step 2 (UE1): Determining at least one of:
 one or more transmitters from the set of transmitters, and
 one or more receivers from the set of receivers,
which are to be used for at least one D2D operation.

The set of transmitters and/or receivers may be the set mentioned above. The determined transmitter/s and/or receiver/s may be of those of the respective set which may be selected and/or selectable and/or suitable and/or configurable for at least one D2D operation. The determined transmitter/s and/or receiver/s and/or the respective sets may on and/or of the D2D device or UE. The D2D or UE (UE1) may comprise a determining module for this determining. Determining may comprise configuring the transmitter/s and/or receiver/s determined for D2D operation for such operation.

Step 3 (UE1)(optional): Using at least one of the determined transmitter/s and/or receiver/s for at least one D2D operation. The D2D device or UE (UE1) may comprise a using module for performing this using.

Step 0a (UE1), Step 1 a (UE1), Step 2a (UE1), Step 3a (UE1)—optional: In addition to the above, any of the Step 0 (UE1), Step 1 (UE1), Step 2 (UE1), and Step 3 (UE1) may be further accompanied by the corresponding Step 0a (UE1), Step 1 a (UE1), Step 2a (UE1), or Step 3a (UE1), respectively, which are performed for at least one non-D2D operation.

A non-D2D operation may generally comprise a cellular operation and/or a radio measurement. Generally, for a-steps, non-D2D operation are substituted for D2D operation of the corresponding steps, e.g. above steps 0 to 3.

There may be considered methods for operating a (second) D2D device or UE (UE2), and/or considered a (second) D2D device or UE adapted for performing, any one of or any one combination of:

Step 1 (UE2)(optional): Obtaining data indicative of at least one of:
 a set of transmitters, and
 a set of receivers,
from which, and/or the data indicating and/or representing which, one or more transmitters and/or receivers, respectively, of the respective set may be selected and/or selectable and/or suitable and/or configurable for at least one D2D operation of and/or by another (first) D2D device or UE (UE1). Alternatively or additionally, the data may indicate or represent which of the transmitters of the set and/or which of the receivers of the set are configured and/or selected and/or used for D2D operation by and/or the other (first) D2D device or UE (UE1). The (second) D2D device or UE may comprise an obtaining module for this obtaining. It may be considered that the set of transmitters and/or receivers and/or a corresponding set of transceivers is a set of and/or on the other (first) D2D device or UE (UE1).

Step 2 (UE2): Assisting the other (first) D2D device or UE (UE1) in determining at least one of:
 one or more transmitters from the set of transmitters, and
 one or more receivers from the set of receivers,
which are to be used by UE1 for at least one D2D operation. The (second) D2D device or UE may comprise an assisting module for this assisting.

Step 1a (UE2), Step 2a (UE2)—optional: In addition to the above, any of the Step 1 (UE2) and Step 2 (UE2) may be further accompanied by the corresponding Step 1a (UE2) or Step 2a (UE2), respectively, which are performed for at least one non-D2D operation.

The (second) D2D device or UE (UE2) generally may be adapted for and/or be in communication with the other (first) D2D device or UE (UE1), e.g. via a cellular connection and/or a D2D connection, e.g. for obtaining and/or assisting.

There may be considered method for operating a network node, and/or a network node adapted for performing, any one or any one combination of:

Step 1 (NW): Obtaining data indicative of at least one of:
 a set of transmitters, and
 a set of receivers,
from which, and/or the data indicating and/or representing which, one or more transmitters and/or receivers of the set, respectively, may be selected for and/or by a (first) D2D device or UE (UE1) for at least one D2D operation. The data may indicate and/or represent which one or more transmitters and/or receivers, respectively, of the respective set may be selected and/or selectable and/or suitable and/or configurable for at least one D2D operation. Alternatively or additionally, the data may indicate or represent which of the transmitters of the set and/or which of the receivers of the set are configured and/or selected and/or used for D2D operation. It may be considered that the set of transmitters and/or receivers and/or a corresponding set of transceivers are a set of and/or on the (first) D2D device or UE (UE1), to which the data may pertain. The network node may comprise an obtaining module for this obtaining.

Step 2 (NW): Assisting UE1 in determining at least one of:
  one or more transmitters from the set of transmitters, and
  one or more receivers from the set of receivers,
which are to be used by UE1 for at least one its D2D operation. The network node may comprise an assisting module for this assisting.

Step 1a (NW), Step 2a (NW)—optional: In addition to the above, any of the Step 1 (NW) and Step 2 (NW) may be further accompanied by the corresponding Step 1 a (NW) or Step 2a (NW), respectively, which are performed for at least one non-D2D operation.

The concepts and methods allow efficient use of its RF hardware resources (e.g. receivers and/or transmitters) for performing D2D operation.

The network node may be enabled to be aware of RF hardware resources (e.g. receivers and/or transmitters) that the D2D device or UE can use for D2D operation.

The network node may configure and/or be adapted to configure the D2D device or UE, e.g. based on the related information or data, e.g. with appropriate carrier and/or band for D2D operation, The D2D device or UE may be adapted to reuse one or more currently unused or spare RF hardware resources (e.g. receivers and/or transmitters) for performing D2D operation such that the cellular operation is enhanced (e.g. no interruption on serving cell) or at least is not degraded.

The D2D device or UE may be adapted to reuse one or more currently unused or spare RF hardware resources (e.g. receivers and/or transmitters) for performing D2D operation such that the power consumption is reduced.

Some generalizations used comprise: Device-to-device (D2D). In some examples, the terms 'D2D' and 'proximity service' (ProSe) and even 'peer-to-peer communication' may be used interchangeably. D2D UE or D2D device or interchangeably called UE or even D2D-capable UE in some embodiments herein, may comprise any entity capable of at least receiving or transmitting radio signals on a direct radio link, i.e., between this entity and another D2D capable entity. A D2D device may also be and/or be comprised in a cellular UE, PDA, a wireless device, laptop, mobile, sensor, relay, D2D relay, or even a small base station employing a UE-like interface, etc. A D2D device is able to support at least one D2D operation. D2D operation may comprise any action or activity related to D2D, e.g., transmitting or receiving a signal/channel type for D2D purpose, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service.

Cellular operation and wireless access network (WAN) operation may be used interchangeably herein.

D2D receive operation (e.g., receiving any signal or channel, with or without decoding, sensing on carrier frequency or specific resources or for a specific channel/signal, etc.) may be comprised in a D2D operation which may, in one example, also involve other than D2D receive operations.

Cellular operation (by UE) may comprise any action or activity related to cellular network (any one or more RATs).

Some examples of cellular operation may be a radio signal transmission, a radio signal reception, performing a radio measurement, performing a mobility operation or RRM related to cellular network.

D2D transmission may be any transmission by a D2D device in D2D operation. Some examples of D2D transmission are physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link is intended for receiving by another D2D device. A D2D transmission may be a unicast, groupcast, or broadcast transmission. A D2D transmission may be on the uplink time-frequency resources of a wireless communication system.

A coordinating or controlling node may be a network node that schedules, decides, at least in part, or selects time-frequency resources to be used for at least one of: cellular transmissions and D2D transmissions. The coordinating node may also provide the scheduling information to another node such as another D2D device, a cluster head, a radio network node such as eNodeB, or a network node (e.g. a core network node, MME, positioning node, D2D server, RNC, SON, etc.). The coordinating node may communicate with a radio network node. The coordinating node may also perform coordination for one or more D2D devices or UEs. The coordination may be performed in a centralized or distributed manner.

Radio spectrum: Although at least some of the embodiments are described for D2D transmissions in the UL spectrum (FDD) or UL resources (TDD), the embodiments are not limited to the usage of UL radio resources, neither to licensed or unlicensed spectrum, or any specific spectrum at all.

A cellular network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology): e.g. LTE FDD, LTE TDD, GSM, CDMA, WCDMA, WiFi, WLAN, WiMAX, etc.

A network node may be a radio network node or another network node. Some examples of the radio network node are a radio base station, a relay node, an access point, a cluster head, RNC, etc. The radio network node is comprised in a wireless communication network and may also support cellular operation. Some examples of a network node which is not a radio network node: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Multiple carrier frequencies may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or even unidirectional (e.g., DL-only band such as Band 29, in some examples).

RF (radio frequency) resources and/or circuitry may generally refer to hardware and/or software and/or circuitry adapted for handling radio frequency signals, in particular for transmission and/or receiving. RF resource may comprise one or more transmitter/s and/or one or more receiver/s and/or one or more transceiver/s and/or suitable circuitry and/or functionality, e.g. for frequency handling/tuning and/or power supply/management and/or modulation/demodulation, and/or filtering, etc.

There are described methods for operating a (first) D2D device or UE,UE1, comprising, and/or a corresponding D2D device adapted for performing, any one or any combination of the following.

Step 0 (UE1) (optional): Obtaining data indicative of at least one of:
  a set of transmitters, and
  a set of receivers,
from which one or more transmitters and/or receivers, respectively, may be selected for at least one D2D operation. The D2D device or UE (UE1) may comprise an obtaining module for performing this obtaining.

Alternatively, Step 0 (UE1) (optional) may comprise obtaining data indicative of and/representing at least one of:
  a set of transmitters, and
  a set of receivers,
from which, and/or the data indicating or representing which, one or more transmitters and/or receivers of the respective set/s, may be selected and/or selectable and/or suitable and/or configurable for at least one D2D operation. Alternatively or additionally, the data may indicate or represent which of the transmitters of the set and/or which of the receivers of the set and/or sets are configured and/or selected and/or used for D2D operation. The D2D device or UE may comprise an obtaining module for this obtaining. It may be considered that the set of transmitters and/or receivers and/or a corresponding set of transceivers is a set of and/or on the D2D device.

Step 1 (UE1) (optional): Sending to another node data indicative of at least one of:
  a set of transmitters, and
  a set of receivers,
from which one or more transmitters and/or receivers, respectively, may be selected for at least one D2D operation. The D2D device or UE (UE1) may comprise a sending module for performing this sending.

Additionally or alternatively, there may be considered:
Step 1 (UE1) (optional): Sending to another node and/or device the obtained data and/or data indicative of and/or representing at least one of:
  a set of transmitters, and
  a set of receivers,
from which, and/or the data indicating and/or representing which, one or more transmitters and/or receivers of the respective set/s may be selected and/or selectable and/or suitable and/or configurable for at least one D2D operation. Alternatively or additionally, the data may indicate or represent which of the transmitters of the set and/or which of the receivers of the set are configured and/or selected and/or used for D2D operation. The D2D device or UE (UE1) may comprise a sending module for this sending. It may be considered that the set of transmitters and/or receivers and/or a corresponding set of transceivers is a set of and/or on the D2D device. Generally, the D2D device may inform and/or be adapted to inform one or more other devices about its capabilities and/or its current setup for D2D operation.

Step 2 (UE1): Determining at least one of:
  one or more transmitters from the set of transmitters, and
  one or more receivers from the set of receivers,
which are to be used for at least one D2D operation. The D2D device or UE (UE1) may comprise a determining module for performing this determining.

Alternatively or additionally, there may be considered Step 2 (UE1): Determining at least one of:
  one or more transmitters from the set of transmitters, and
  one or more receivers from the set of receivers,
which are to be used for at least one D2D operation.

The set of transmitters and/or receivers may be the set mentioned above. The determined transmitter/s and/or receiver/s may be of those of the respective set which may be selected and/or selectable and/or suitable and/or configurable for at least one D2D operation. The determined transmitter/s and/or receiver/s and/or the respective sets may on and/or of the D2D device or UE.

The D2D or UE (UE1) may comprise a determining module for this determining. Determining may comprise configuring the transmitter/s and/or receiver/s determined for D2D operation for such operation.

Step 3 (UE1)(optional): Using the determined transmitter and/or receiver for at least one D2D operation. The D2D device or UE (UE1) may comprise a using module for performing this using.

Step 0a (UE1), Step 1 a (UE1), Step 2a (UE1), Step 3a (UE1)—optional: In addition to the above, any of the Step 0 (UE1), Step 1 (UE1), Step 2 (UE1), and Step 3 (UE1) may be further accompanied by the corresponding Step 0a (UE1), Step 1 a (UE1), Step 2a (UE1), or Step 3a (UE1), respectively, which are performed for at least one non-D2D operation.

Generally, the data obtained, in particular data indicative of at least one of:
  a set of transmitters, and
  a set of receivers,
from which one or more transmitters and/or receivers, respectively, may be selected for at least one D2D operation and/or indicating or representing which transmitter/s and/or receiver/s may be selected for D2D operation, may further comprise, e.g., any one or more of:
  an explicit set of selectable transmitters and/or receivers (e.g., indicated by identities, antenna ports, etc.),
  data that may be associated with a selectable set of transmitters and/or receivers, e.g.:
  one or more of carrier frequency or frequency band, e.g.:
  for its D2D operation on carrier frequency f2, UE1 may select a transmitter and/or receiver that may be used for carrier frequencies (f1, f2, f3) or (f1, f3), wherein (f1, f2, f3) and (f1, f3) are the sets of frequencies associated with electable transmitters and/or receivers
  RAT,
  bandwidth, system bandwidth, measurement bandwidth, channel bandwidth, transmission bandwidth,
  transmitter RF characteristics (e.g., emissions, tx filter configuration),
  receiver RF characteristics (e.g., sensitivity, spurious response, rx filter configuration),
  condition which a selectable transmitter and/or receiver shall meet,
  requirements or performance target the UE will have to meet using a selected transmitter and/or receiver, e.g.:
  for its D2D operation, UE1 may select any transmitter and/or receiver (whichever is needed for the D2D operation) so that the interruption on PCell is minimized or does not occur.
  Type of D2D operation or D2D service, e.g. D2D discovery, D2D communication, etc.

Relation between carrier frequencies and/or frequency bands used for D2D operation and for cellular operation (aka wireless access network (WAN) operation) in UL and/or DL The association between any of the above and the transmitter and/or receiver, respectively, may be done in a D2D device or UE or a network node. It may be pre-defined or configurable (e.g., statically, semi-statically, or dynamically) and/or it may also depend on the transmitter and/or receiver availability. In one example, some receivers and/or transmitters may be always or almost always used only for one specific frequency band. In another example, some receivers and/or transmitters may be associated dynamically with the above, depending, e.g., on:

- Another receiver and/or transmitter currently used by the D2D device or UE (UE1) and the RF configuration in which it is being used,
- Type of CA (e.g. intra-band contiguous or inter-band CA) supported by the D2D device or UE or inter-frequency configuration thereof, e.g. of UE1,
- Requirements or performance quality that the D2D device or UE (UE1) may need to meet for D2D and/or non-D2D operation (e.g., to not cause interruption on PCell or in any serving cell or an allowed interruption should not exceed a threshold while performing D2D on another carrier). During interruption (aka glitch) the D2D device or UE may not transmit to and/or receive signals from a serving cell e.g. PCell.
- CA configuration e.g. frequency combination, band combination, bandwidth combination, number of UL and/or DL CCs in CA supported by the UE.

In yet another example, a set may be an empty set, e.g., when there is no transmitter and/or receiver that satisfy a condition and/or may be selected.

In yet another example, a set may be an ordered or a sorted set, e.g., based on preference in decreasing order.

Methods of obtaining (Step 0/0a) are described as follows.

The data indicative of a set of transmitters and/or receivers may be obtained by a D2D device or UE (UE1) in one or more ways, e.g.:

- Data may be pre-defined and/or read, e.g. data stored in a memory of and/or accessible by control circuitry of the D2D device;
- Received from another D2D device or UE or a network node, e.g. via D2D operation and/or cellular operation;
- Autonomously determined by the D2D device or UE (UE1) e.g. based on stored CA capability information regarding the D2D device or UE(UE1), RF architecture of the D2D device or UE, based on measurements, etc
- Read from an external or internal memory,
- Determined based on a pre-defined rule.

Methods of sending (Step 1/1a) are described as follows. The D2D device or UE (UE1) may send and/or be adapted to send at least one obtained set and/or corresponding data, which may be data obtained as described herein, to another node (e.g., another D2D device or UE or a network node) via higher and/or lower layer signalling and/or D2D operation and/or cellular operation. The information may be sent as a part of information or data regarding the D2D device's or UE's radio access capability to another node or D2D device. The information may be sent in any RRC state to another node (e.g., another D2D device or UE or a network node) or even in out of coverage state to another D2D device or UE; wherein out of coverage refers to a state in which the D2D device (UE1) is not connected and/or connectable and/or covered by a cellular network.

The sending may be in an unsolicited way or upon a request from another node, an event, a trigger, or a condition e.g. after cell change or handover or when signal quality falls below a threshold.

Examples comprise:
The D2D device (UE1) may select a transmitter and/or receiver operable in any of frequency band, e.g., band denoted 'By', for its operation in frequency band denoted 'Bx':

(B2, (B1, B2, B3)) where Bx=B2, By=(B1, B2, B3)

UE1 may select a transmitter and/or receiver operable in any of carrier frequency Fy for its operation in carrier frequency Fx:

(f2, (f1, f2, f3), (f4, [requirement])) where Fx=f2, Fy=(f1, f2, f3), while meeting a pre-defined and specified requirement on f4

Methods of determining (Step 2/2a) are described as follows. Step 2 may comprise:

Step 2_1: Determining at least one set of transmitters and/or receivers based on the data indicative of the sets and/or of selectable transmitter/s and/or receiver/s, e.g., reading an explicit list comprised in the data or determining a set implicitly associated with the data, and/or determining based on the data, in particular according to a list of preference or priority in the data; and/or Step 2_2: Determining at least one transmitter and/or receiver from the corresponding set(s).

The D2D device or UE (UE1) may be adapted to determine and/or determines one or more transmitters and/or receivers from the corresponding set in one or more ways, e.g., any one or more of:

- Randomly or pseudo randomly,
- Selecting/determining the one from the set based on the order of transmitters and/or receivers in the set e.g. first one from the set or last one from the set,
- Selecting/determining the one with the largest physical separation from the closest in the current use,
- Selecting/determining the one with the best expected performance (e.g., no or the smallest impact on UE1's performance on the other carrier). For example the one which ensures no interruption of signals on the serving cell when UE1 uses it for D2D operation or the one which ensures minimal interruption of signals on the serving cell when UE1 uses it for D2D operation. For example minimal interruption time can be one slot or one subframe and longer interruption time can be 4-5 subframes.
- Selecting/determining the one from the set that would lead to least power consumption e.g. one that belongs to same chip on which serving cell is configured in UL and/or DL carrier or band.
- In one embodiment, the selection/determining may be applied always or in a specific UE mode operation, e.g., low-power mode or power-saving mode
- Selecting/determining the one from the set that is not being used by the D2D device or UE (UE1) or performing radio measurements for cellular operation in UL and/or DL.
- Selecting/determining based on a synchronization aspect, e.g., some transmitters/receivers may be already time and/or frequency synchronized to some reference clock or reference timing or target frequency [so the D2D device or UE (UE1) does not need to spend time and resources to achieve the desired synchronization], some transmitters/receivers may achieve better synchronization or timing accuracy than others, etc.

Selecting/determining based on the switching or (re) tuning time needed to use the candidate transmitter/receiver, e.g., some transmitter/receiver might be recently used on the same carrier and thus would require less tuning before being ready for use, etc.

Selecting/determining based on the time when the transmitter and/or receiver to be selected will be needed (e.g., the remaining time and/or for how long it will be used)

Selecting/determining based on how fast the selection can be made and the selected transmitter and/or receiver can be made available for using Any combination of the above, wherein different selection/determining types may be combined in different ways, e.g., according to their priorities, according to a pre-defined or a dynamically determined order, according to D2D device or UE configuration or configuration from another node, based on a pre-defined rule, etc.

Any selection/determining mode above or their combination may be applied for selecting one or more transmitters and/or receivers. The selection/determining by one selection/determining mode may also be limited, in some examples, to a certain number N (e.g., N=1, N=2, etc.) of transmitters and/or receivers (e.g., not more than N=1 receiver can be selected following the selection approach 'take first from the ordered sequence'); N may be statically or dynamically configured or determined based on a pre-defined rule.

Selecting/Determining an occupied transmitter and/or receiver is described as follows. A D2D device or UE may in some variant be adapted to determine and/or determine or use a transmitter/s and/or receiver/s which is/are in use for a cellular operation or other non-D2D operation and, if needed, it may reselect the transmitter and/or receiver correspondingly for the cellular operation.

In one embodiment, if the selected and/or determined transmitter and/or receiver is already in use for a non-D2D operation (while still selectable for D2D operation), UE1 may still determine or select (and further use) that transmitter and/or receiver for D2D operation; however, if needed (e.g., if the use of the transmitter and/or receiver cannot be shared in time for the D2D-operation and the non-D2D operation and/or have to be used only for one operation type), the UE1 may determine or select another transmitter and/or receiver, respectively, for the non-D2D operation, unless the transmitter and/or receiver may be shared in time for D2D and non-D2D operation.

In another embodiment, afterwards the UE may determine the transmitter/s and/or receiver/s for a non-D2D operation and/or the original operation, and/or 'return' the transmitter and/or receiver 'borrowed' for the D2D operation, e.g., when it is not used any more for D2D or more needed for non-D2D operation or after some time during which the 'borrowing' is allowed.

In yet another embodiment, UE1 may be adapted to determine or select, and/or determine or select, the transmitter and/or receiver for D2D when it is already in use for a non-D2D operation only if the D2D operation has a higher priority than that of the non-D2D operation.

Methods of using (Step 3/3a) are described as follows. The determined or selected transmitter/s and/or receiver/s may be used, e.g., for transmitting or receiving, respectively, at least one radio signal during UE1's D2D operation.

For example, based on the received signal using the selected or determined receiver, e.g., UE1 may further perform a measurement for its autonomous use or reporting the performed measurement to another node (e.g., another UE or a network node).

The measurements/transmission/receptions may be performed for a general or a specific purpose, for cellular and/or D2D operations, e.g.:

RRM aka mobility measurements e.g. RSRP, RSRQ, measurements on D2D signals or for D2D operation purpose RLM e.g. out of sync and in sync detection for cellular and/or D2D operations.

Positioning e.g. RSTD, UE Rx-Tx time difference measurement, other timing measurements, power-based measurements, measurements used for fingerprinting or pattern matching, etc Broadcast measurements, e.g., MBMS and MBMS-like measurements (e.g., MBSFN RSRP/RSRQ, MCH BLER), etc.

MDT e.g. RSRP, RSRQ, inter-RAT measurements such as CPICH RSCP, CPICH Ec/No, GSM carrier RSSI etc.

SON e.g. reading of system information (such as MIB, SIB etc)

Carrier sensing e.g. RSSI measurement or interference estimation on specific resources, etc.

Carrier selection for D2D operation

Channel estimation e.g. reference signal SINR

Link adaptation e.g. BLER, SNR, SINR etc.

Power control e.g. path loss, SINR, SNR etc.

Interference coordination e.g. SNR, SINR, etc.

Receiving/transmitting, which may also include demodulation or decoding, D2D data and/or control information e.g. PDSCH demodulation, and/or allocation data decoding/demodulation.

Methods in a second UE are described as follows. There are described methods for operating a second D2D device or UE, UE2, comprising, and/or a second D2D device or UE (UE2) adapted for performing, any one or any combination of:

Step 1 (UE2)(optional): Obtaining data indicative of at least one of:
a set of transmitters, and
a set of receivers,
from which one or more transmitters and/or receivers, respectively, may be selected for UE1 for at least one its D2D operation. UE2 may comprise an obtaining module for performing this obtaining.

Additionally or alternatively, there may be considered:
Step 1 (UE2)(optional): Obtaining data indicative of at least one of:
a set of transmitters, and
a set of receivers,
from which, and/or the data indicating and/or representing which, one or more transmitters and/or receivers of the respective set may be selected and/or selectable and/or suitable and/or configurable for at least one D2D operation of and/or by another (first) D2D device or UE (UE1).

Alternatively or additionally, the data may indicate or represent which of the transmitters of the set and/or which of the receivers of the set are configured and/or selected and/or used for D2D operation by and/or the other (first) D2D device or UE (UE1).

The (second) D2D device or UE may comprise an obtaining module for this obtaining. It may be considered that the set of transmitters and/or receivers and/or a corresponding set of transceivers is a set of and/or on the other (first) D2D device or UE (UE1).

Step 2 (UE2): Assisting UE1 in determining at least one of:
- one or more transmitters from the set of transmitters, and
- one or more receivers from the set of receivers, which are to be used by UE1 for at least one its D2D operation. UE2 may comprise an assisting module for this determining.

Step 1a (UE2), Step 2a (UE2)—optional: In addition to the above, any of the Step 1 (UE2) and Step 2 (UE2) may be further accompanied by the corresponding Step 1a (UE2) or Step 2a (UE2), respectively, which are performed for at least one non-D2D operation.

Methods of obtaining the data (Step 1/1a (UE2)) are described as follows. The data indicative of a set of transmitters and/or receivers (see also methods in UE1 for some examples and the definition) may be obtained by UE2 in one or more ways, e.g.:
- May be pre-defined,
- Received from UE1 or another UE or a network node,
- Autonomously determined by UE2 e.g. based on stored D2D device or UE CA capability information, D2D device or UE RF architecture, based on measurements, etc,
- Read from an external or internal memory,
- Determined based on a pre-defined rule.

UE2 assisting UE1 (Step 2/2a (UE2)) is described as follows.

Herein, the assisting performed by the (second) D2D device or UE (UE2) in determining at least one of transmitter and/or receiver for UE1 may further comprise, e.g.:
- Sending the data indicative of at least one of set of transmitters and/or receivers to UE1,
- Sending at least one of set of transmitters and/or receivers to UE1,
- Selecting one or more transmitters and/or receivers from the corresponding set and signalling the selected transmitters and/or receivers to UE1,
- Sending at least one of set of transmitters and/or receivers to UE1,
- Relaying or forwarding the data indicative of at least one of set of transmitters and/or receivers from UE1 to another D2D device or UE or to a network node,
- Relaying or forwarding at least one of set of transmitters and/or receivers from UE1 to another D2D device or UE or to a network node,
- Relaying or forwarding the data indicative of at least one of set of transmitters and/or receivers to UE1 from another D2D device or UE or from a network node,
- Relaying or forwarding at least one of set of transmitters and/or receivers to UE1 from another D2D device or UE or from a network node.

Examples (see also examples in the methods for UE1):
- UE1 may select a transmitter and/or receiver operable in any of frequency band 'By' for its operation in frequency band 'Bx':
- (B2, (B1, B2, B3)) where Bx=B2, By=(B1, B2, B3)
- UE1 may select a transmitter and/or receiver operable in any of carrier frequency Fy for its operation in carrier frequency Fx:
- (f2, (f1, f2, f3), (f4, [requirement])) where Fx=f2, Fy=(f1, f2, f3), while meeting a pre-defined a specified requirement on f4

Methods in a network node are described as follows. Some examples of a network node are: eNodeB, coordinating node, ProSe/D2D server.

Herein, there are described methods for operating a network node, NW, comprising, and/or a network node, NW, adapted for performing, any one or any combination of:

Step 1 (NW): Obtaining data indicative of at least one of:
- a set of transmitters, and
- a set of receivers, from which one or more transmitters and/or receivers, respectively, may be selected for UE1 for at least one its D2D operation. The network node may comprise an obtaining module for performing this obtaining.

Alternatively or additionally, there may be considered Step 1 (NW): Obtaining data indicative of at least one of:
- a set of transmitters, and
- a set of receivers, from which, and/or the data indicating and/or representing which, one or more transmitters and/or receivers of the respective set may be selected for and/or by a (first) D2D device or UE (UE1) for at least one D2D operation. The data may indicate and/or represent which one or more transmitters and/or receivers, respectively, of the respective set may be selected and/or selectable and/or suitable and/or configurable for at least one D2D operation. Alternatively or additionally, the data may indicate or represent which of the transmitters of the set and/or which of the receivers of the set are configured and/or selected and/or used for D2D operation. It may be considered that the set of transmitters and/or receivers and/or a corresponding set of transceivers are a set of and/or on the (first) D2D device or UE (UE1), to which the data may pertain. The network node may comprise an obtaining module for this obtaining.

Step 2 (NW): Assisting UE1 in determining at least one of:
- one or more transmitters from the set of transmitters, and
- one or more receivers from the set of receivers, which are to be used by UE1 for at least one its D2D operation.

Step 1a (NW), Step 2a (NW)—optional: In addition to the above, any of the Step 1 (NW) and Step 2 (NW) may be further accompanied by the corresponding Step 1a (NW) or Step 2a (NW), respectively, which are performed for at least one non-D2D operation.

Methods of obtaining the data (Step 1/1a (NW)) are described as follows. The data indicative of a set of transmitters and/or receivers (see also methods in UE1/UE2 for some examples and the definition) may be obtained by NW in one or more ways, e.g.:
- May be pre-defined,
- Received from UE1 or another D2D device or UE or a network node,
- Autonomously determined by NW e.g. based on historical data about the UE1 transmitters/s and/or receiver/s, based on measurements,
- Read from an external or internal memory,
- Based on a pre-defined rule,
- Implicitly based on information about the D2D device or UE RF architecture e.g. RF bandwidth over which D2D device or UE causes no interruption when configured with CA Methods of assisting UE1 (Step 2/2a (NW)) are described as follows. Herein, assisting UE1 by the network node in determining at least one of transmitter and/or receiver may comprise, e.g.:
- Sending the data indicative of at least one of set of transmitters and/or receivers to UE1,
- Sending at least one of set of transmitters and/or receivers to UE1, Selecting one or more transmitters and/or receivers from the corresponding set and signalling the selected transmitters and/or receivers to UE1, Sending at least one of set of transmitters and/or receivers to UE1, Relaying or forwarding the data indicative of at least one of set of transmitters and/or receivers between UE1 and another D2D device or UE or a network node, Relaying or forwarding at least one of set of transmitters and/or receivers between UE1 and another D2D device or UE or a network node.

Examples (see also examples in the methods for UE1):

UE1 may select a transmitter and/or receiver operable in any of frequency band By for its operation in frequency band Bx:

(B2, (B1, B2, B3)) where Bx=B2, By=(B1, B2, B3)

UE1 may select a transmitter and/or receiver operable in any of carrier frequency Fy for its operation in carrier frequency Fx:

(f2, (f1, f2, f3), (f4, [requirement])) where Fx=f2, Fy=(f1, f2, f3), while meeting a pre-defined a specified requirement on f4

Generally, a D2D device or UE may obtain information about one or more transmitters and/or receivers that may be selected for at least one D2D operation by the D2D device or UE, e.g., autonomously and/or pre-defined information and/or based on indication received from a network node. The D2D device or UE may be adapted for selection/determining of one or more transmitters and/or receivers for D2D operation based on one or more conditions (e.g. transmitter and/or receiver that do not cause interruption on a serving cell such as PCell or the time available or needed for making the selected transmitter and/or receiver ready for use). The D2D device or UE may be adapted to use the obtained information for performing a D2D operation and/or to determine transmitter/s and/or receiver/s for such use. The D2D device or UE may also be adapted for using and/or use the transmitter and/or receiver which are in use for a cellular operation and, if needed, it may reselect the transmitter and/or receiver correspondingly for the cellular operation. The method in particular applies to a D2D device which is also capable of CA operation or other D2D device or UE architectures which have two or more transmitters and/or receivers.

There may in general be considered a D2D device adapted to perform any one of the methods for operating a D2D device described herein. The D2D device may comprise suitable circuitry, e.g. control circuitry, e.g. for controlling a method, and/or transmitter/s and/or receiver/s and/or corresponding circuitry and/or antenna circuitry. There may be considered a network node adapted to perform any one of the methods for operating a network node described herein. The network node may comprise suitable circuitry, e.g. control circuitry, e.g. for controlling a method, and/or transmitter/s and/or receiver/s and/or corresponding circuitry and/or antenna circuitry Any of the D2D devices or UEs described herein (in particular, UE1 and UE2), may be a D2D device or UE for and/or of a wireless communication network, and/or adapted for cellular operation with a wireless communication network and/or for D2D operation.

Any of the network nodes (which in particular may be eNodeBs) described herein (in particular NW), may be a network node for and/or of a wireless communication network, and/or adapted for cellular operation with a wireless communication network, and/or at least one D2D device or UE, and/or for D2D operation and/or control of D2D operation, in particular with or of at least one D2D device or UE.

Additionally or alternatively, there may generally be considered a controlling node adapted to perform any one of the methods for operating a network node described herein.

A controlling node or network node may generally be implemented as base station or eNodeB.

According to a further aspect, there is provided a program product comprising code executable by control circuitry, the code causing the control circuitry to perform and/or control any one of the methods described herein.

Moreover, there is described, according to another aspect, a carrier medium carrying any one of the program products described herein and/or code executable by control circuitry, the code causing the control circuitry to perform and/or control any one of the methods as described herein.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A mobile communication network may generally comprise one or more than one network nodes, in particular a controlling node as described herein, and/or a radio access network (which may comprise the one or more than one network nodes) and/or a core network connected or connectable to the radio access network. The network and/or controlling node may be adapted to provide one or more cells for wireless and/or radio communication and/or to serve one or more D2D devices or UEs. A mobile communication network may be a cellular network. The controlling node may be adapted for controlling and/or serving and/or provide and/or support cellular communication and/or D2D communication.

Determining and/or obtaining and/or receiving a measurement performance characteristic may generally comprise determining and/or obtaining and/or receiving one or more than one measurement performance characteristics.

Configuring a D2D device may involve instructing and/or causing the D2D device to change its configuration, e.g. at least one setting and/or register entry and/or operational mode. Configuring a D2D device for D2D measurement may refer to instructing and/or causing the D2D device to change operational parameters for D2D measurement, in particular according to a measurement performance characteristic. A D2D device may be adapted to configure itself. Configuring a D2D device by another device or node or network may refer to and/or comprise transmitting information and/or data and/or instructions to the D2D device by the other device or node or network, e.g. a D2D configuration and/or data regarding transmitter/s and/or receiver/s and/or data based upon which the configured or receiving D2D device may determine at least one transmitter and/or receiver to use, e.g. data indicating a preferred spectrum and/or frequency and/or carrier to be used. Configuring may involve changing one or more parameters and/or settings of the D2D device, in particular regarding transmitter/s and/or receiver/s.

Adapting a configuration may refer to configuring the D2D device, in particular by changing the configuration, e.g. by the D2D device.

Obtaining data may comprise receiving, e.g. from another node and/or device and/or the network, the data. Determining a transmitter and/or receiver for D2D operation may comprise selecting and/or configuring the transmitter and/or receiver for D2D operation. Configuring a radio resource like a transmitter or receiver may include adapting it for a desired operation, e.g. D2D operation, for example by tuning its operation parameters, e.g. frequency, bandwidth, power level, sensitivity, etc.

A D2D device may be considered to be connected or connectable for communication if it is able to communicate with another node or device or a network via wireless communication, in particular via D2D communication and/or cellular communication, e.g. if it is registered or may be registered in the network or with another D2D device, and/or is in such communication. Generally, a D2D device may be adapted for D2D operation and cellular operation, either in parallel or alternatively.

Receiving or transmitting, e.g. in the context of configuring the D2D device, may generally be performed via cellular communication and/or D2D communication.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header.

Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry.

Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a D2D device and/or user equipment and/or base station and/or relay node and/or any device generally adapted for device-to-device communication.

A wireless communication network may comprise at least one of a device configured for device-to-device communication, a D2D device, and/or a user equipment and/or base station and/or relay node, in particular at least one user equipment, which may be arranged for device-to-device communication with a second D2D device or node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A user equipment (UE) may generally be a device configured for wireless device-to-device communication (it may be a D2D device) and/or a terminal for a wireless and/or cellular network, in particular a mobile terminal, for example a mobile phone, smart phone, tablet, PDA, etc. A user equipment may be a node of or for a wireless communication network as described herein, in particular a D2D device. It may be envisioned that a user equipment or D2D device is adapted for one or more RATs, in particular LTE/E-UTRA. A user equipment or D2D device may generally be proximity services (ProSe) enabled, which may mean it is D2D capable or enabled. It may be considered that a user equipment or D2D device comprises radio circuitry and/or control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or D2D device. It may be considered that a user equipment is configured to be a user equipment adapted for LTE/E-UTRAN.

A base station may be any kind of base station of or for a wireless and/or cellular network adapted to serve one or more user equipments. It may be considered that a base station is a network node of or for a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

Device-to-device (D2D) communication or operation may generally refer to communication between nodes or D2D devices of or for a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments.

Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or controlling node and/or with a base station or controlling node providing merely auxiliary services, e.g. configuration data or a transmission configuration or related information for a message intended for device-to-device communication between user equipments. D2D communication may be communication between two D2D devices in a region without cellular coverage and/or without interaction with a cellular or mobile network. In the latter case, it may be considered that data and/or signals flowing between the nodes performing device-to-device communication are not transported via a base station and/or controlling node. In contrast, during cellular communication, network layers above the eNB/base station/coordination node may generally be involved, in particular core layers which may be connected to the eNB/base station/coordinating node via cable/land line.

During device-to-device communication, a message may be provided and/or transmitted and/or received. A message may be considered to be or be represented by a batch of physical layer transmissions and/or may comprise such. A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected. A device configured for and/or capable of device-to-device communication, which may be called D2D device or D2D enabled node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources may generally be frequency and/or time resources. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D device to transmit to and/or for a second D2D device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more D2D devices, in particular to a first D2D device. Accordingly, D2D resource allocation may be performed by the network and/or by a node, in particular a node within and/or within a cell of a cellular network covering the D2D devices participating or intending to participate in the D2D communication.

Allocation data may be considered to be data indicating and/or granting resources allocated by the allocation node, in particular data identifying or indicating which resources are reserved or allocated for D2D communication for a D2D device and/or which resources a D2D device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission, e.g. for the first D2D device. The first D2D device may generally be adapted to perform transmission configuration according to allocation data, in particular to set a corresponding power level. It may be considered that allocation data comprises and/or is implemented as TPC and/or in TPC format.

A D2D transmission may be considered to be of a different type than a cellular and/or UL transmission. A transmission may pertain to a specific frequency and/or spectrum and/or bandwidth and/or carrier.

A receiver or receiver chain may generally be provided by a transceiver arrangement, which may have transmitting capabilities included, or as a separate arrangement, which may be implemented without having transmitting capacities included.

A measurement gap may refer to a time gap or interval, in which no transmission and reception happens, in particular regarding a serving cell or a given carrier. Since there is no signal transmission and reception during the gap (at least in the serving cell or given carrier), a D2D device or UE can switch to another or a target cell or carrier and/or perform a measurement on the target cell or carrier, e.g. for signal quality, utilizing the same receiver.

The term "intra-frequency" may refer to issued related to the same frequency/bandwidth and/or carrier, e.g. between neighboring cells (which may be provided by different BSs) having the same frequencies available. The term "inter-frequency" may refer to issues related to different frequencies/bandwidths and/or carriers, e.g. between different carriers in a multi-carrier arrangement.

A receiving operation may comprise a measurement operation, e.g. a signal quality measurement, which may be performed in a measurement gap, in which a receiver switching to a carrier/frequency to be measured may be performed.

In the context of this description, a D2D device generally may be a device capable of D2D communication and/or operation, in particular using frequencies and/or resources of a cellular and/or licensed communication system, e.g. a system according to a LTE standard, and may be also referred to as D2D enabled or capable UE or node. A D2D device may comprise any entity or equipment or device or node capable of at least receiving and/or transmitting radio signals on a direct radio link, i.e., between the entity and another D2D capable entity or D2D device. A D2D device or D2D device may for example be comprised in or comprise a cellular UE, PDA, a wireless device, laptop, mobile, sensor, relay, D2D relay, a small base station employing a UE-like interface, etc. Any device or entity capable to support and/or perform at least one D2D operation may be considered a D2D device; a D2D device may be adapted to support and/or perform at least one D2D operation. A D2D device may generally be adapted for cellular operation and/or communication in a wireless communication network. It may be considered that a D2D device generally comprises radio circuitry and/or control circuitry for wireless communication, in particular D2D operation or communication and cellular operation or communication.

A D2D device may comprise a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably with D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D. D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a D2D device or UE. A D2D receive operation may comprise receiving, by a D2D device, of D2D data and/or signals. A D2D transmit operation may comprise, transmitting, by a D2D device, of D2D data and/or signals. A D2D device performing at least one D2D operation may be considered to be in D2D or D2D mode or in D2D operation. D2D operation may comprise D2D measurements.

A D2D measurement may be a measurement, e.g. performed by a D2D device, performed for D2D purpose and/or on D2D signals/channels and/or regarding D2D operation and/or communication. D2D measurement may comprise any one or any combination of: D2D RRM measurement, D2D positioning measurement, D2D synchronization measurement, measurement on D2D synchronization signals, measurement on D2D reference signals, measurement on D2D channel/s, signal-to-noise measurement, signal strength measurement, signal quality measurement, in particular measurement of received signal strength, of received signal quality, RLM, synchronization, one-directional and/or two-directional timing measurement, RTT or Rx-Tx or similar measurement, measurement of number of successful and/or unsuccessful channel decodings or receptions, data throughput measurements, measurement of amount of data transmitted and/or received, billing-relevant measurement; these measurement may be performed regarding D2D communication and/or D2D operation.

Cellular operation (in particular by a D2D device or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission or communication may be any transmission or communication by a D2D device or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another D2D device. A D2D transmission may be a unicast, groupcast, or broadcast transmission. A D2D transmission may be on the uplink time-frequency resources of a wireless communication system.

A controlling node may generally be a network node connected or connectable to a D2D device for cellular and/or D2D communication. A controlling node may be defined by its functionality of providing and/or transmitting a measurement performance characteristic to a D2D device and/or of configuring the D2D device, in particular based on the measurement performance characteristic. A controlling node may be a network node that is adapted to schedule, decide and/or select and/or allocate, at least in part, time-frequency resources to be used for at least one of: cellular communication or transmissions and D2D communication or transmissions. The controlling node may also provide scheduling information and/or measurement performance characteristic to another node, such as another D2D device, a cluster head, a radio network node such as eNodeB, or a network node (e.g. a core network node), MME, positioning node, D2D server, RNC, SON, etc). The network node or controlling node may communicate with a radio network node. It may be envisioned that a controlling node may also perform coordination and/or control for one or more D2D device or UEs. The coordination and/or control may be performed in a centralized or distributed manner. A controlling node may be referred to as an allocating node and/or a coordinating node.

A network device or node and/or a D2D device may be or comprise a software/program arrangement arranged to be executable by a hardware device, e.g. control circuitry, and/or storable in a memory, which may provide D2D functionality and/or corresponding control functionality.

Radio spectrum: Although at least some of the embodiments may be described for D2D transmissions in the UL spectrum (FDD) or UL resources (TDD), the embodiments are not limited to the usage of UL radio resources, neither to licensed or unlicensed spectrum, or any specific spectrum at all.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may be a radio network node (which may be adapted for wireless or radio communication, e.g. with a D2D device or a UE) or another network node. A network node generally may be a controlling node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication. A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a D2D device or UE, if it provides a cell of a cellular network to the served node or D2D device or UE and/or is connected or connectable to the D2D device or UE via and/or for transmission and/or reception and/or UL and/or DL data exchange or transmission and/or if the network node is adapted to provide the D2D device or UE with allocation and/or configuration data and/or a measurement performance characteristic and/or to configure the D2D device or UE.

Multiple carrier frequencies or functionality may refer to any of: different carrier frequencies within the same frequency band or within different frequency bands, same PLMN or different PLMNs, same RAT or different RATs. D2D operation may or may not occur on dedicated carrier frequencies. DL and UL carrier frequencies in FDD are also examples of different carrier frequencies. A frequency band herein may be FDD, TDD, HD-FDD, or unidirectional (e.g., DL-only band such as Band 29, in some examples). Multiple carrier functionality may include carrier aggregation functionality, in which multiple carriers or cells are used for transmission and/or reception between two participants of communication. The carriers may be continuous in the spectrum or discontinuous.

The term 'TPC for D2D' used herein may refer to or comprise at least one power control command for one or more of D2D transmissions (e.g., SA, D2D data, D2D synchronization signal, D2D control channel, D2D discovery transmission, any D2D transmission for D2D communication, any D2D transmission for D2D discovery). 'TPC for cellular UL' may comprise or refer to at least one power control command sent by or via a network node or eNodeB to control tx power of one or more cellular UL transmissions. The two different types of TPCs may be sent in the same or separate messages to the D2D device or UE, via the same or different channels or channel types (e.g., PDCCH and/or EPDCCH) and/or be comprises in one set or packet or message of allocation data or in different sets or packets or messages of allocation data.

A D2D device may generally be a node or device adapted to perform D2D communication, in particular transmission and/or reception, and/or at least one type of D2D operations. In particular, a D2D device may be a terminal and/or user equipment and/or D2D enabled machine and/or sensor. The D2D device may be adapted to transmit and/or receive D2D data based on allocation data, in particular on and/or utilizing resources indicate in the allocation data. D2D communication and/or transmission by a D2D device may generally be in UL resources and/or corresponding carrier or frequency and/or modulation. A D2D device (such as a UE) may be adapted for and/or capable of CA or CA operation. In particular, it may be adapted to transmit and/or receive one or more than one CCs and/or utilising, and/or participating in, carrier aggregation. A D2D device may be adapted to configure itself and/or be configured according to configuration data, which may include setting up and/or scheduling resources and/or equipment for receiving and/or transmitting and/or sharing of resources and/or in particular D2D operation and/or cellular operation based on the configuration data.

Configuration data may be received, by the D2D device, from another node or D2D device, in particular a network node. A network node, in particular a controlling and/or allocating node, may generally be adapted to provide and/or determine and/or transmit configuration data, in particular to a D2D device. Configuration data may be considered to be a form of allocation data and/or may be provided in the form of a message and/or data packet/s. Configuring a D2D device or UE, e.g. configuring of the node by a network node, may include determining and/or transmitting configuration data to the node to be configured, i.e. the D2D device or UE. Determining the configuration data and transmitting this data to a D2D device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Transmit power (or power density) may generally refer to the power (or power density) of a signal transmitted or generally to the power of wireless transmission. Transmit power (or power density) may in particular refer to the power (or power density) of a signal transmitted by and/or transmissions of a D2D device or UE. Transmit power generally may refer to a specific channel and/or frequency and/or cell and/or carrier and/or bandwidth and/or carrier aggregate and/or a general setup. UL transmit power, or shorter UL power, may refer to the power of a signal transmitted, in particular by a D2D device or UE, in cellular operation and/or to or for a network node serving the D2D device or UE, for example a base station or eNodeB. D2D transmit power (or power density) may refer to the power (or power density) of a signal transmitted, in particular by a D2D device or UE, in D2D operation and/or for D2D transmission. Transmit power (or power density) may refer to or pertain to a time unit or interval, e.g. a slot, subframe or frame, and/or transmit power control may be performed for and/or updated in such units or intervals. Power control or transmit power control may generally refer to control of transmit power and/or transmit power spectral and/or temporal density. Power control commands in TPC format or TPC may be used for controlling power and/or to cause a D2D device or UE receiving at least one such command or TPC message to control power based on and/or according to the command or TPC. The command or TPC may be transmitted to the D2D device from or via a network node, in particular a base station or eNB or allocating node.

Cellular DL operation and/or communication of a D2D device or UE may refer to receiving transmissions in DL, in particular in cellular operation and/or from a network node/eNB/base station. Cellular UL operation of a D2D device or UE may refer to UL transmissions, in particular in cellular operation, e.g. transmitting to a network node/eNB/base station.

Indicating an information and/or condition, in particular indicating by a first node to a second node, may comprise transmitting the information, a corresponding message and/or data and/or indication, in particular from the first node to the second node node, e.g. via a cellular transmission or a D2D transmission, or if the first node and second node are connected by cable, via cable.

In general, obtaining predefined data may comprise reading such data from a memory and/or accessing such data.

Each or any one of the D2D devices or user equipments shown in the figures may be adapted to perform the methods to be carried out by/for operating a user equipment or D2D device described herein. Alternatively or additionally, each or any of the D2D devices or user equipments shown in the figures may comprise any one or any combination of the features of a user equipment or D2D device described herein.

Each or any one of the network nodes or controlling nodes or eNBs or base stations shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Some abbreviations used are:
3GPP 3$^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a D2D device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
L1 Layer 1
L2 Layer 2
LTE Long Term Evolution
MAC Medium Access Control
MBSFN Multiple Broadcast Single Frequency Network
MDT Minimisation of Drive Test
MPC Measurement Performance Characteristic
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UL Uplink; generally referring to transmission of data to a node/into a direction closer to a network core (physically and/or logically); in particular from a D2D device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions where appropriate.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details. For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a device-to-device (D2D) device for a wireless communication network, the D2D device comprising a set of transmitters and/or a set of receivers, the set of transmitters and/or set of receivers each comprising at least two that are capable of D2D operation according to a first radio access technology, the method comprising determining one or more transmitters from the set of transmitters and/or one or more receivers from the set of receivers to be used for at least one D2D operation.

2. The method of claim 1, wherein the determined one or more transmitters from the set of transmitters and/or one or more receivers from the set of receivers to be used for at least one D2D operation comprises a first transmitter and the at least one D2D operation comprises a data transmission, via the first transmitter, from the D2D device to a second D2D device.

3. The method of claim 1, wherein the determined one or more transmitters from the set of transmitters and/or one or more receivers from the set of receivers to be used for at least one D2D operation comprises a first receiver and the at least one D2D operation comprises a data reception, via the first receiver, at the D2D device from a second D2D device.

4. The method of claim 1, wherein the D2D device is configured to receive data from a network node in downlink (DL) radio spectrum and/or DL radio resources and to transmit data to the network node in uplink (UL) radio spectrum and/or UL radio resources, and wherein the D2D operation comprises transmitting data to and/or receiving data from a second D2D device in the UL radio spectrum and/or UL radio resources.

5. A device-to-device (D2D) device for a wireless communication network, the D2D device comprising a set of transmitters and/or a set of receivers, the set of transmitters and/or set of receivers each comprising at least two that are capable of D2D operation according to a first radio access technology, the D2D device further comprising a processor circuit configured to determine one or more transmitters from the set of transmitters and/or one or more receivers from the set of receivers to be used for at least one D2D operation.

6. The D2D device of claim 5, wherein the determined one or more transmitters from the set of transmitters and/or one or more receivers from the set of receivers to be used for at least one D2D operation comprises a first transmitter and the at least one D2D operation comprises a data transmission, via the first transmitter, from the D2D device to a second D2D device.

7. The D2D device of claim 5, wherein the determined one or more transmitters from the set of transmitters and/or one or more receivers from the set of receivers to be used for at least one D2D operation comprises a first receiver and the at least one D2D operation comprises a data reception, via the first receiver, at the D2D device from a second D2D device.

8. The D2D device of claim 5, wherein the D2D device is configured to receive data from a network node in downlink (DL) radio spectrum and/or DL radio resources and to transmit data to the network node in uplink (UL) radio spectrum and/or UL radio resources, and wherein the D2D operation comprises transmitting data to and/or receiving data from a second D2D device in the UL radio spectrum and/or UL radio resources.

9. A method for operating a second device-to-device (D2D) device for a wireless communication network, the method comprising assisting a first D2D device in determining one or more transmitters from a set of transmitters and/or one or more receivers from a set of receivers, which are to be used by the first D2D device for at least one D2D operation.

10. A second device-to-device (D2D) device, for a wireless communication network, the second D2D device being configured to assist a first D2D device in determining one or more transmitters from a set of transmitters and/or one or more receivers from a set of receivers, which are to be used by the first D2D device for at least one D2D operation.

11. A method for operating a network node in a wireless communication network, the method comprising assisting a first device-to-device (D2D) device in determining one or more transmitters from a set of transmitters and/or one or more receivers from a set of receivers, which are to be used by the first D2D device for at least one D2D operation.

12. A network node for a wireless communication network, the network node being configured to assist a first device-to-device (D2D) device in determining one or more transmitters from a set of transmitters and/or one or more receivers from a set of receivers, which are to be used by the first D2D device for at least one D2D operation.

* * * * *

UNITED STATES PATENT AND TRADEMARK OFFICE
CERTIFICATE OF CORRECTION

PATENT NO. : 10,708,963 B2
APPLICATION NO. : 15/516306
DATED : July 7, 2020
INVENTOR(S) : Siomina et al.

It is certified that error appears in the above-identified patent and that said Letters Patent is hereby corrected as shown below:

In the Specification

In Column 5, Line 64, delete "Step 1 a" and insert -- Step 1a --, therefor.

In Column 6, Line 1, delete "Step 1 a" and insert -- Step 1a --, therefor.

In Column 7, Line 10, delete "Step 1 a" and insert -- Step 1a --, therefor.

In Column 10, Line 25, delete "Step 1 a" and insert -- Step 1a --, therefor.

In Column 10, Line 29, delete "Step 1 a" and insert -- Step 1a --, therefor.

Signed and Sealed this
Twenty-ninth Day of December, 2020

Andrei Iancu
*Director of the United States Patent and Trademark Office*